(No Model.)
O. HANSON.
CAR COUPLING.
No. 473,742. Patented Apr. 26, 1892.
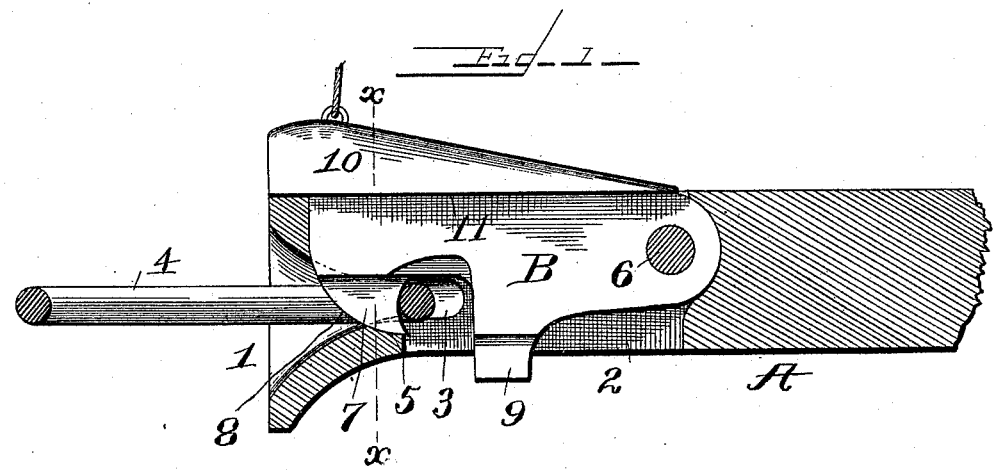
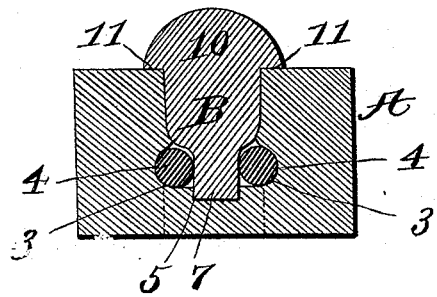
Witnesses
G. A. Tauberschmidt
James E. Lawrence
Ole Hanson Inventor
by
Harvey Spalding & Sons
his Attorneys

UNITED STATES PATENT OFFICE.

OLE HANSON, OF LAKE CRYSTAL, MINNESOTA.

CAR-COUPLING.

SPECIFICATION forming part of Letters Patent No. 473,742, dated April 26, 1892.

Application filed November 21, 1891. Serial No. 412,601. (No model.)

*To all whom it may concern:*

Be it known that I, OLE HANSON, a citizen of the United States, residing at Lake Crystal, in the county of Blue Earth and State of Minnesota, have invented certain new and useful Improvements in Car-Couplings, of which the following is a specification.

My invention relates to an improvement in car-couplings, the object being to provide a coupler which shall be of simple and durable construction, reliable and effective in operation, and adapted to be operated automatically, thus avoiding the necessity of going between the cars to effect a coupling.

The invention consists of a weighted dog of peculiar construction, in combination with a draw-head of special form adapted to receive and support the coupling-dog.

In the drawings, Figure 1 is a longitudinal section of my improved draw-head and coupling-dog, and Fig. 2 is a horizontal section on the line $x\,x$ of Fig. 1.

A indicates the draw-head, formed with the usual flaring mouth 1 and with a longitudinal bottom opening 2. Within the draw-head on either side, is formed a longitudinal slot 3 to receive one end of the coupling-link 4, and a recess 5 to serve as a seat for the hook of the coupling-dog.

B indicates the dog pivotally supported within the draw-head by a bolt 6, which passes through the dog and the sides of the draw-head, as shown. The front end of the dog is provided with a hook 7, the outer side 8 of which is curved to receive the contact of the link. At about the center of the dog a lug 9 depends therefrom to limit the inward movement of the link.

10 indicates a block weighted at its outer end and constituting the top of the dog. This weight-block projects beyond the dog at each side and at its outer end to form a shoulder 11 to bear upon the top of the draw-head.

It will be apparent from the construction above described that the contact or thrust of the link will raise the dog until the link passes the hook 7, when the dog will drop by gravity and thus securely hold the link. A staple or hook 12 is secured to the top of the weight-block 10, to which a cord, chain, or rod may be attached to raise the dog to uncouple the link. The end of the hook 7 when the link is coupled, rests in the seat 5 of the draw-head.

Having fully described my invention, what I claim as new, and desire to secure by Letters Patent, is—

1. The combination, with a draw-head formed with longitudinal slots 3, a seat 5, and a bottom opening, as described, of a dog pivotally secured within the draw-head and provided with a hook 3, and a depending lug 9, substantially as described.

2. The combination, with a draw-head formed with longitudinal slots 3, a seat 5, and a bottom opening 2, of a gravity-dog formed with a curved hook 3, a link stop or lug 9, and a weighted block formed with a shoulder 11, substantially as described.

In witness whereof I have hereunto set my hand in the presence of two witnesses.

OLE HANSON.

Witnesses:
H. ARNESON,
G. W. FRANCHERE.